United States Patent [19]
Yang et al.

[11] 3,924,982
[45] Dec. 9, 1975

[54] CENTRIFUGAL TIRE CASTING MACHINE

[75] Inventors: James H. C. Yang, Cleveland; Heinz W. Beneze, Akron, both of Ohio

[73] Assignee: The Firestone Tire & Rubber Company, Akron, Ohio

[22] Filed: Feb. 18, 1975

[21] Appl. No.: 550,806

[52] U.S. Cl. .............................. 425/35; 425/242
[51] Int. Cl.² .. B29H 5/02; B29H 17/00; B29F 1/00; B29C 5/04
[58] Field of Search ........ 425/28 R, 33, 35, 40, 242

[56] References Cited
UNITED STATES PATENTS

| | | | |
|---|---|---|---|
| 3,457,594 | 7/1969 | Baudou | 425/35 |
| 3,645,655 | 2/1972 | Benege | 425/35 |
| 3,695,808 | 10/1972 | Benege | 425/35 X |
| 3,868,203 | 2/1975 | Turk | 425/40 X |
| 3,879,161 | 4/1975 | McGillvary | 425/33 |

FOREIGN PATENTS OR APPLICATIONS

| | | | |
|---|---|---|---|
| D1,116,893 | 11/1961 | Germany | 425/28 R |
| 965,269 | 7/1964 | United Kingdom | 425/40 |

*Primary Examiner*—J. Howard Flint, Jr.

[57] ABSTRACT

A centrifugal tire casting machine is disclosed, which includes in combination a rotatable drive shaft and a rotatable idler shaft in axial alignment with each other. Means are provided for axially moving at least one of the drive and idler shafts toward and away from the other so as to extend through an axial opening in a core member and into engagement with the other of the drive and idler shafts to rotatably support the core member. A first and a second mold half are located on opposite sides of the core member and each is adapted to move inwardly and outwardly between open and closed positions. The first and second mold halves, in closed position, being in rotative driving engagement with the core and, also defining a tire cavity in combination with the core member. Drive means extend between the drive shaft and the core member for rotatively driving the core member and means are provided for moving the first and second mold halves between open and closed positions.

15 Claims, 10 Drawing Figures

CENTRIFUGAL TIRE CASTING MACHINE

Apparatus presently utilized in the centrifugal casting of vehicle tires usually comprises a core, tread ring and two outer shells or mold halves which are normally made of a metal, such as aluminum or steel. These mentioned parts are quite accurately machined and are held together by a multiplicity of bolts, clamps or other mechanical devices. Once these parts are assembled, the entire assembly is normally connected to some sort of rotating shaft which rotates the assembly at the desired molding speed and an elastomeric substance, such as polyurethane, is introduced into the mold cavity which is formed between the core and the mold halves. The assembly, after production of the tire, is then disassembled in order to remove the completed tire from the apparatus and this requires the service of trained personnel with a resultant large expenditure of time because of the multiplicity of mechanical devices utilized to connect the assembly together.

Extreme care is required on the part of the trained personnel in order to prevent damage to the various parts of the assembly, such as the core, tread ring and mold halves. The task is normally time consuming and cumbersome since an average mold may weigh on the order of 500 lbs. The same amount of difficulty is encountered when the entire assembly is put back together again, preparatory to the production of another vehicle tire.

The present invention has as its primary object the construction or production of a machine or apparatus which can be operated semi-automatically or which can, without difficulty, be completely automated for use in the production of centrifugally cast vehicle tires.

In general, the present machine is comprised of inboard and outboard assemblies, which are mounted on a common base or frame. An inboard shaft, which is rotatably driven by a suitable drive motor, provides the rotative power for rotating the entire assembly. An outboard shaft is adapted to move axially through a central opening in a core and into engagement with the end of the inboard shaft to secure the core in position and provide a means for rotative support of the same. Two mold halves are respectively formed as part of the inboard and outboard assemblies. These mold halves open and close in an axial direction by means of hydraulic actuation, which serves to keep the core and tread ring in place during centrifugal casting and, also, provides a quick means of mold disassembly after the casting process is completed. The hydraulic means of holding the two mold halves in engagement with each other and in proper position with respect to the core, eliminates all of the fastening devices that were previously required. All of the other handling procedures necessary with highly trained personnel are essentially eliminated with the present apparatus. The present apparatus is capable of centrifugally casting a vehicle tire by means of semi-automatic or fully-automatic operation.

The present invention, also, simplifies the assembly and disassembly of mold halves in the centrifugal casting of vehicle tires and greatly reduces the possibility of damage to molds and other parts. The cost of mold halves are greatly reduced since only one set of mold halves is required for multiproduction and the production time in the centrifugal casting of tires is greatly reduced with the obvious advantage of reducing the cost of each tire.

Other objects and a fuller understanding of this invention may be had by referring to the following description and claims, taken in conjunction with the accompanying drawings, in which:

Figure 1:
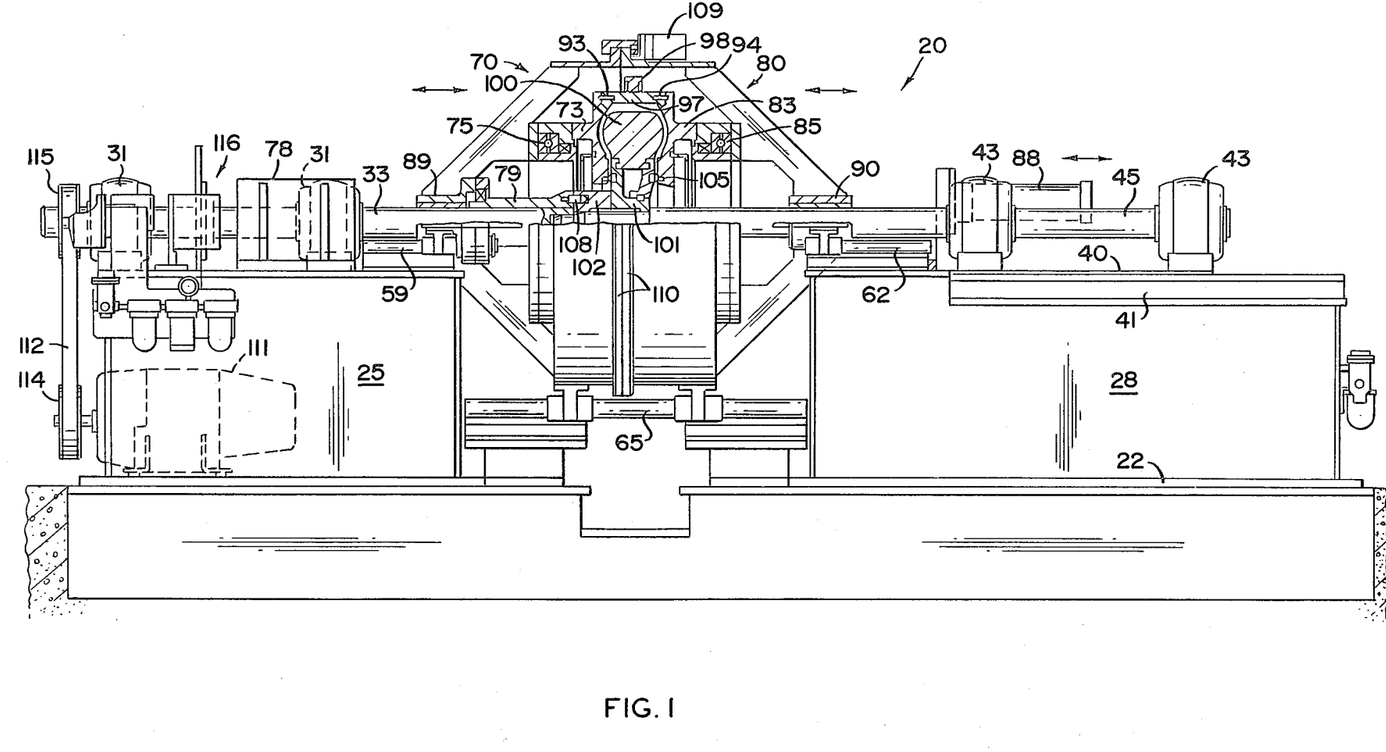
FIG. 1 is an elevational view, partly in section, showing the centrifugal tire casting machine of the present invention.
Figure 2:
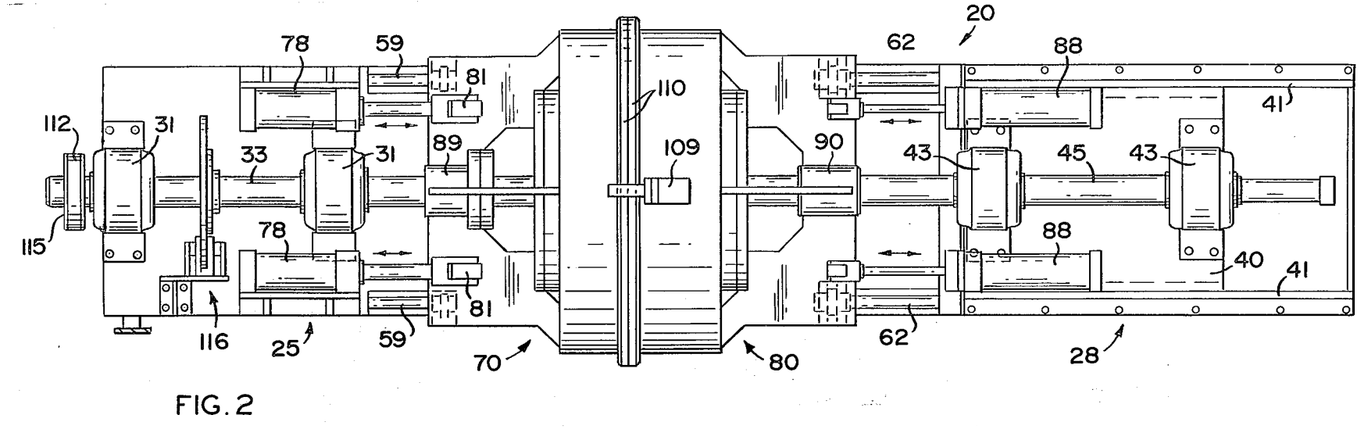
FIG. 2 is a plan view of the tire casting machine shown in FIG. 1.

The overall configuration of the centrifugal tire casting machine of the present invention is best seen in FIGS. 1 and 2 of the drawings and the machine is indicated generally by the reference numeral 20. The machine includes in combination a base 22, sometimes referred to as the frame, suitably mounted in a floor or other structure as indicated. Inboard and outboard housings 25 and 28, respectively, are supported by the base. First bearing means 31 are located on the inboard housing 25 in a fixed position and include two pillow block members and these serve to rotatably support a drive shaft 33 in a fixed axial position and motive power means are provided to rotate the shaft in a manner which will be described in more detail hereinafter. Wall means 36 serve to define an axially extending recess in the right end of shaft 33, as viewed in FIG. 1.

Figure 4:
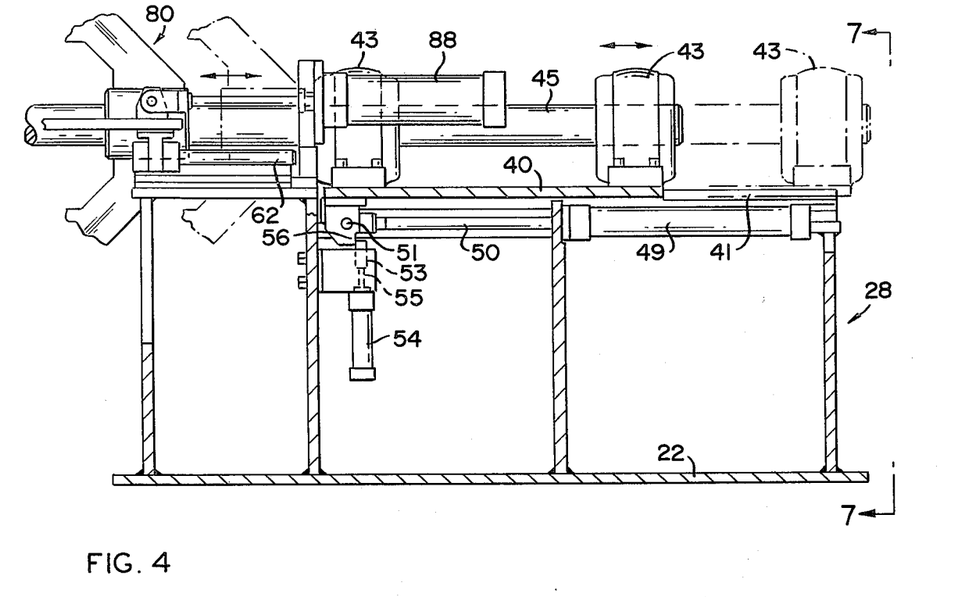
FIG. 4 is an enlarged view of the right end portion of the machine shown in FIG. 1.
Figure 5:
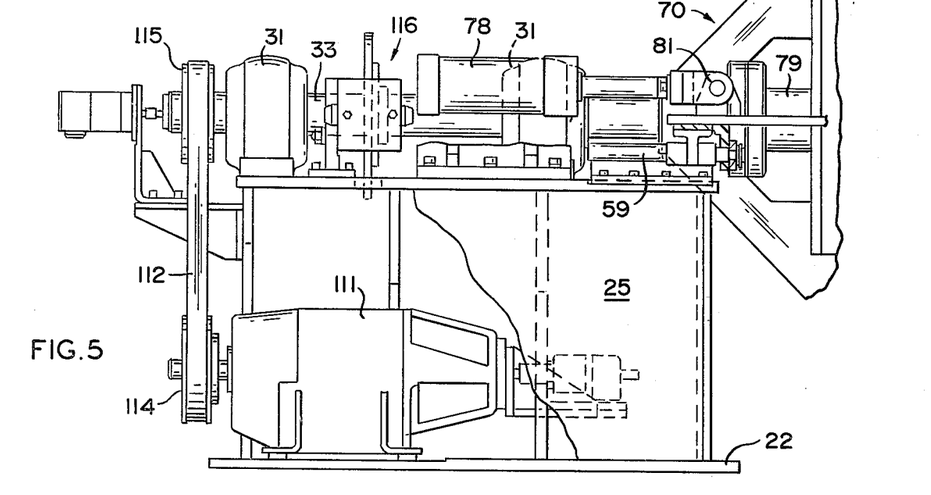
FIG. 5 is an enlarged view of the left end of the machine shown in FIG. 1.
Figure 6:
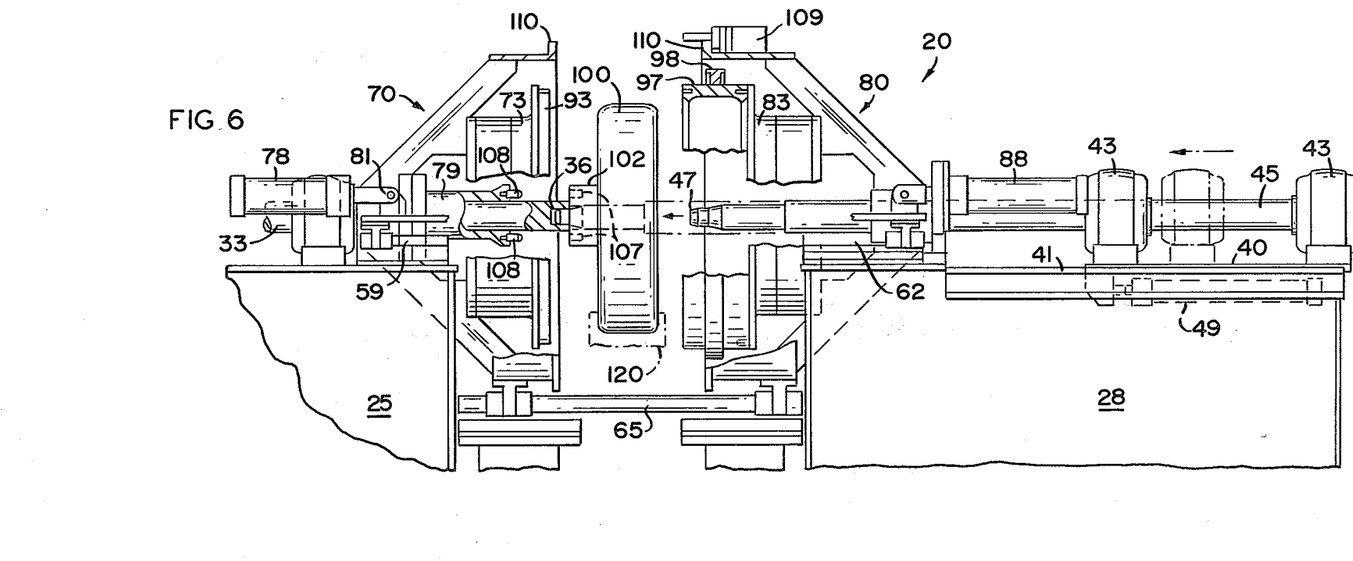
FIG. 6 is a view similar to FIG. 1; however, showing the machine parts in slightly different positions, namely, with the two mold halves open, the outboard shaft retracted, the core in place and a rotary air clamp unlatched.
Figure 7:
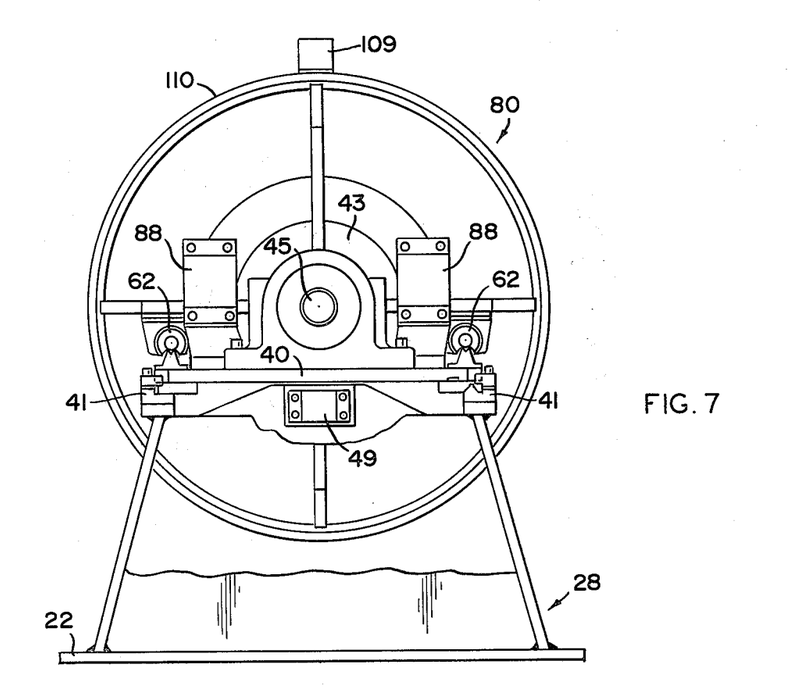
FIG. 7 is a right end view of FIG. 4.

A movable support member 40 is mounted in the outboard housing 28 for movement back and forth in ways 41 which are best seen in FIG. 7. It will thus be seen by referring to FIGS. 1, 2, 4 and 6 that the entire movable support member 40 is adapted to move back and forth between extreme left and right positions. The movable support member 40 carries thereon second bearing means 43, which include first and second pillow block members and the second bearing means 43 serve to rotatably support an idler shaft 45. Wall means 47 are provided on the left end of the idler shaft 45 and are so-formed as to interfit with the recess 36 in the right end of drive shaft 33. The movable support member 40 is moved between the two extremes of its travel by way of a hydraulic cylinder 49 (FIG. 4) which is secured to the outboard housing 28, and a piston, which carries a rod extension 50, which is, in turn, secured to the movable support member 40 as at 51. The movable support member 40 is locked in its extreme position to the left, as viewed in FIGS. 1 and 4, by means of a latch 53 which engages the shoulder 56 as shown and which is actuated by an air cylinder 54 and piston rod 55. The two positions of the movable support member may be referred to as the inward position, as shown in FIGS. 1 and 4 and the outward position, as shown in FIG. 6. In the most inward position the guide end 47 on the idler shaft nests or resides within the recess 36 in the drive shaft 33. It will thus be understood that the drive shaft 33 is mounted in a fixed axial position and is adapted for rotation and the idler shaft 45 is adapted to be moved axially in and out of engagement with the drive shaft and is, also, capable of rotative movement.

Figure 3:
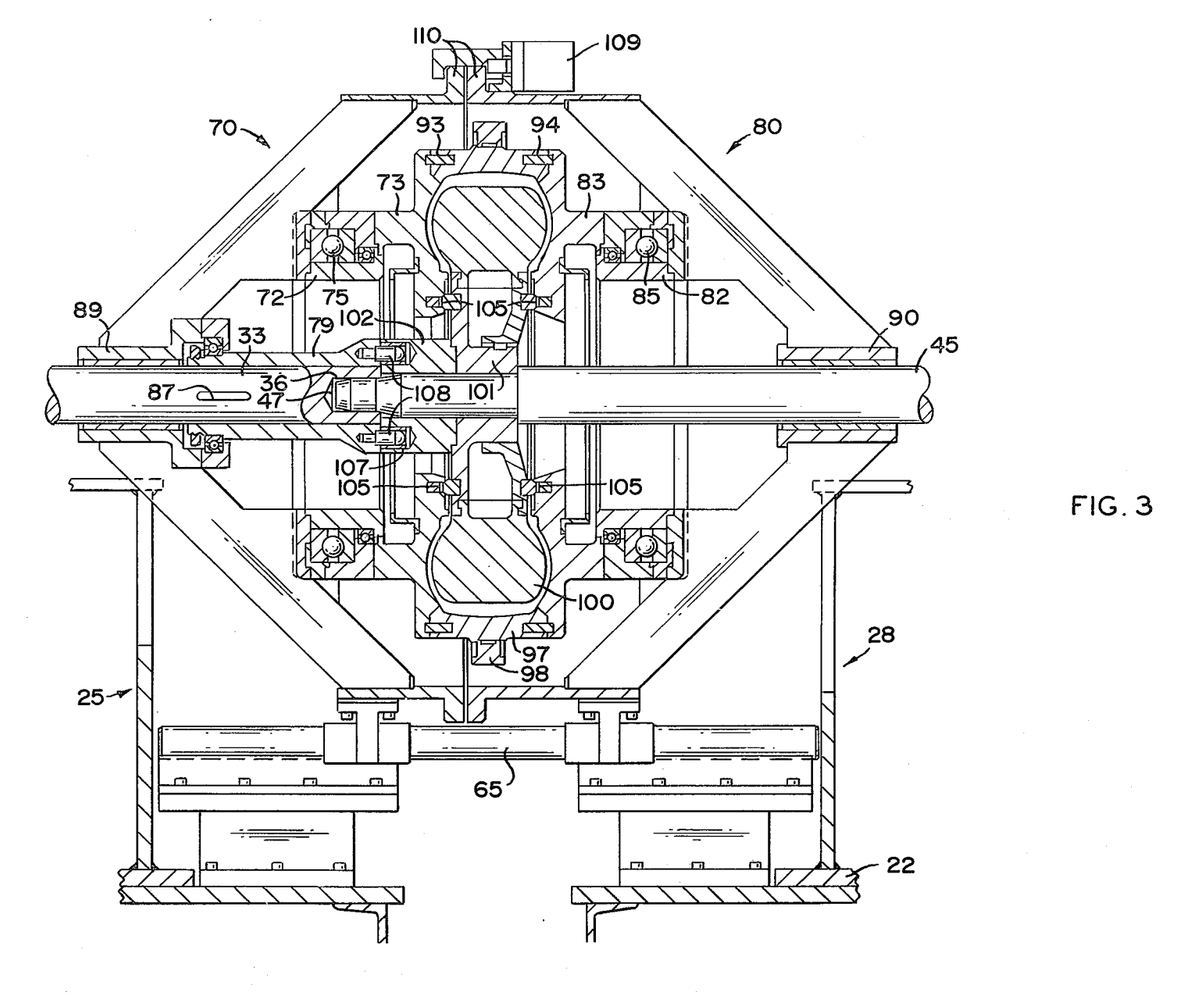
FIG. 3 is an enlarged sectional view of the central portion of the machine shown in FIG. 1.

Two horizontally extending guide rods 59 are provided on the inboard housing 25 and in like manner two horizontally extending guide rods 62 are provided on the outboard housing and a single guide rod 65 extends between the housings 25 and 28. The purpose of these guide rods is to support what have been referred to as an inboard mold assembly 70 and an outboard mold assembly 80, as these two assemblies move back and forth between a closed position, which is shown in FIGS. 1, 2 and 3, to an open position, which is illustrated in FIG. 6. The back and forth movement of the inboard and outboard mold assemblies 70 and 80, in addition to being supported by the guide rods 59, 62 and 65 is, also, supported by axial sliding movement of bearing sleeves 89 and 90 which respectively slide on the drive shaft 33 and the idler shaft 45. Sleeve 89 is connected to and moves axially back and forth with assembly 70 and permits rotation of drive shaft 33 with respect thereto since it is not rotatively connected thereto. The inboard mold assembly 70 comprises a nonrotatable member 72 connected to a rotatable first or inboard mold half 73 by means of bearing means 75. Two hydraulic cylinder and piston means 78 are mounted on the inboard housing 25 and are connected by means of a piston rod extension secured to the inboard mold assembly as at 81. This serves to move the inboard mold assembly back and forth between its closed position shown in FIGS. 1 and 3 and its open position shown in FIG. 6.

The outboard mold assembly 80, in like manner, is movable between its inner closed position shown in FIGS. 1 and 3 and outer position shown in FIG. 6, on the guide rods 62 and 65. The outboard mold assembly, in like manner, comprises a nonrotatable member 82 connected to a rotatable second or outboard mold half 83 through bearing means 85. The outboard mold assembly includes two hydraulic cylinder and piston means 88 mounted on the outboard housing 28 and connected to the outboard mold assembly 80 as shown to move assembly 80 back and forth on its above mentioned axial movement.

The first mold half 73 is provided with a circumferentially extending guide ring 93 and the second mold half 83 is provided with a circumferentially extending guide ring 94. The guide rings 93 and 94 are suitably, fixedly mounted in position preferably by bolts or other securing means. The purpose of the guide rings 93 and 94 is to support a tread ring 97, which is usually constructed of two or more segments secured about their peripheral extent by means of a retainer ring 98. The tread ring 97 is located simply by fitting the guide rings 93 and 94 into the opposed grooves on either side thereof, so that in the open position of the mold assemblies, as seen in FIG. 6 the tread ring 97 is carried by the outboard or second mold half 83. As the two mold halves come together, the guide ring 93 in the inboard mold assembly simply moves into the groove on the left side of the tread ring 97 as seen in FIG. 3.

Figure 8:
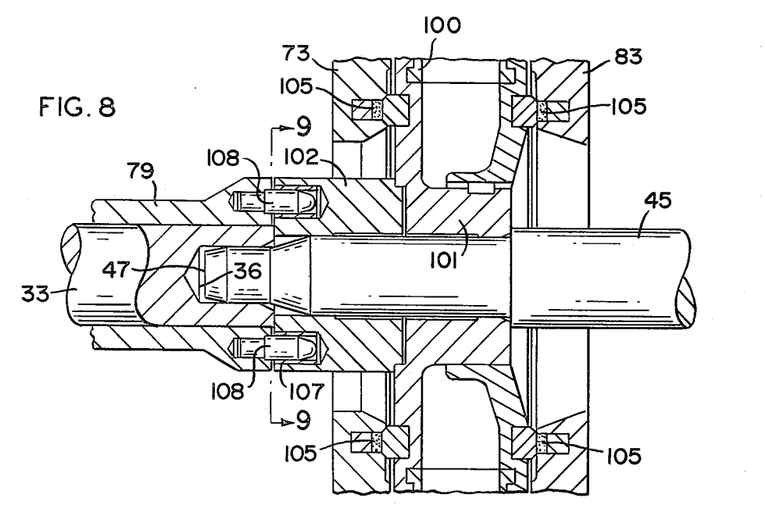
FIG. 8 is a fragmentary enlarged sectional view showing the inboard and outboard shaft junction.
Figure 9:
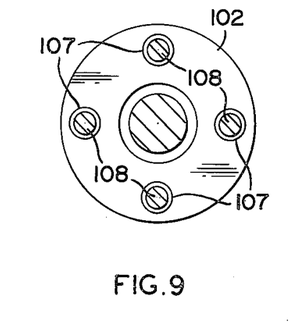
FIG. 9 is a view taken generally along the line 9—9 of FIG. 8.
Figure 10:
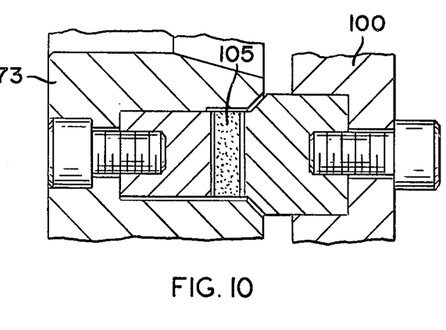
FIG. 10 is a fragmentary, enlarged sectional view of the clutch means between the mold halves and the core.

The assembly, also, includes a core 100 which is normally made up of a plurality of arcuate segments and as seen in FIG. 3 this core is located between the first and second mold halves 73 and 83 and serves to define, in combination with the tread ring and the mold halves, a tire cavity. The core includes a hub member 101 and what will be referred to as a hub extension 102 which has a plurality of openings 107 in the extreme axial face thereof. A drive sleeve 79 is rotatably secured to the drive shaft 33 by means of a key and keyway construction, which enables the sleeve 79 to be moved axially with respect to the drive shaft 33. FIG. 3 shows the key 87 and it will be understood that the keyway is on the inner surface of sleeve 79 and is of a length to accommodate axial movement of sleeve 79 between the positions shown in FIGS. 3 and 6. The drive sleeve 79 carries a plurality of pins 108, which are adapted to move axially into the openings 107 to rotatably connect the hub extension, hub member and core to the drive shaft. It will be seen from FIG. 3 that in the closed condition of the mold assemblies the core is supported upon the extreme left end of the idler shaft 45. There are, also, provided a plurality of circumferentially extending clutch discs 105, best shown in FIGS. 3, 8 and 10 of the drawings and these clutch plates serve the primary function of providing a rotative drive connection between the first and second mold halves 73 and 83 and the hub member 101 of the core. A rotary air clamp (FIG. 3) 109 is provided, which is adapted to lock the two assemblies 70 and 80 together by means of engaging flanges 110 on the two assemblies.

Rotational drive is imparted to drive shaft 33 by means of a DC motor 111 mounted by the inboard housing 25 and this motor serves to drive a sheave 114 connected to the output shaft thereof, which in turn drives a belt 112 connected to another sheave 115, which is connected to the drive shaft 33. A disc brake 116 is provided for preventing the rotation of the drive shaft 33 or bringing it to a stop once it is rotating.

The operation of the centrifugal tire casting machine of the present invention is essentially as follows:

With the machine in the position shown in FIG. 6, in other words with the mold assemblies 70 and 80 in their completely retracted positions and with the idler shaft completely retracted, the core 100, which includes the hub member and hub extension 101 and 102, is brought into position by means of a transporting mechanism 120 not shown in detail herein. While the transport mechanism is holding the core and its associated parts in the position shown in FIG. 6, the hydraulic cylinder 49 is actuated moving the movable support member 40 and the idler shaft 45 carried thereby axially toward the drive shaft 33 until the guide end 47 of the idler shaft 45 extends through the axial opening in the hub member 101 and hub extension 102 of the core 100 and nests in the recess 36 of the drive shaft. This is shown in the dotted line position of shaft 45 seen in FIG. 6. At this point the core and its associated parts are properly supported and the transport assembly 120 for the core is then moved out of the machine. The next step is the actuation of the hydraulic cylinder and piston means 78, which moves the inboard mold assembly 70 axially toward the outboard mold assembly 80 to position it as shown in FIGS. 1, 2 and 3. After the inboard mold assembly has been so positioned, the hydraulic cylinder and piston means 88 on the outboard housing 28 are actuated, thereby moving the outboard mold assembly axially inwardly to position it as shown in the closed position of FIGS. 1, 2 and 3. As noted, this movement brings all of the mold and core parts into their engaged positions and secures the tread ring 97 between the two guide rings 93 and 94. The movement of the inboard mold assembly 70 previously described brings the drive sleeve 79 (which is rotatively connected to the drive shaft 33) into driving engagement with the core by means of the pins 108 nesting in the openings 107. As the outboard mold assembly 80 is brought into position, the clutch plates 105 between the hub member 101 and the first and second mold halves are, also, engaged. It is to be understood that hydraulic cylinder and piston means 78 and 88 are always maintained under hydraulic pressure during the centrifugal casting operation but as an additional safety precaution, rotary air clamp 109 is actuated which securely locks the two assemblies together by engagement of the same with the two flanges 110. The DC motor 111 is next actuated causing rotation of the drive shaft and rotation of the core and mold parts and suitable elastomeric material of which a tire is to be formed is injected into the mold cavity. Rotation of the assembly is continued for the proper period of time, well appreciated by those skilled in the art, and the details of this are not important to the disclosure of the present invention. It is, also, possible to provide heating elements in the mold assemblies to provide the proper amount of cure for curing the vehicle tire being cast.

After the centrifugal casting procedure has been completed, the DC motor 111 is deactivated and rotation of the drive shaft brought to a stop by means of the brake 116. The reverse procedure of that outlined above is then undertaken to remove the completed tire from the casting machine. These steps, stated very briefly, are the unlocking of the rotary air clamp 109, the retraction of the outboard mold assembly 80, and then retraction of the inboard assembly 70. The core transport mechanism 120 is next brought into position adjacent the completed tire; and when the tire, core and tread ring are appropriately supported thereby, the idler shaft 54 is retracted by retraction of the movable support member 40. The core transport mechanism can then remove the finished tire containing the core and surrounded by the tread ring and thereafter a new core assembly is transported to the machine and the complete procedure outlined above is repeated. It is, of course, necessary to place another tread ring 97 in the machine prior to the casting of each tire.

In operation of the machine, it is preferred that the force in one direction exerted by hydraulic piston and cylinder means 78 be slightly greater than the additive force of hydraulic cylinder and piston means 88 and hydraulic cylinder 49 in the opposite direction so that inboard mold assembly 70 is always located consistently in the same position. The hydraulic force of the just mentioned cylinders is always maintained during centrifugal casting and is essentially the only force holding the molds together. The clamp 109 is essentially a safety feature to prevent the molds from accidentally coming apart should the hydraulic pressure fail. As mentioned above, separation of the molds is effected simply by retraction of the various elements by the hydraulic means and without the necessity of removing complicated fasteners.

It will, therefore, be apparent that the presently disclosed centrifugal tire casting machine completely simplifies the assembly and disassembly of the two mold parts and the other associated structure. With the precision which is built into the machine of the present invention, the possibility of damage to the molds and other precision machined parts is greatly lessened. The production time for centrifugally casting vehicle tires is reduced substantially with resultant lowering of the cost of each unit produced. This reduction in production costs is greatly enhanced in that only one set of mold halves is required for a given production unit and a plurality of core assemblies can be used in combination with the single set of mold halves.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tire casting machine including in combination a base, inboard and outboard housings mounted on said base, first bearing means mounted on said inboard housing, a drive shaft rotatably mounted by said first bearing means on said inboard housing, wall means defining a recess in the inward axial end of said drive shaft, a movable support member mounted by said outboard housing, second bearing means carried by said support member, an idler shaft rotatably mounted by said second bearing means on said support member, wall means defining a guide end on the inward axial end of said idler shaft, hydraulic piston and cylinder means for moving said support member and idler shaft from an outer position inwardly to an inward position where said guide end of said idler shaft is received in said recess in said drive shaft, horizontally extending guide rods, an inboard mold assembly movable axially between inner and outer positions on said guide rods and relative to said drive shaft, said inboard mold assembly comprising a nonrotatable member connected to a rotatable first mold half through bearing means, hydraulic piston and cylinder means for moving said inboard mold assembly between said inner and outer positions, an outboard mold assembly movable axially between inner and outer positions on said guide rods and relative to said idler shaft, said outboard mold assembly comprising a nonrotatable member connected to a rotatable second mold half through bearing means, hydraulic piston and cylinder means for moving said outboard mold assembly between said inner and outer positions, a circumferentially extending tread ring secured to outer peripheral portions of said first and second mold halves, a core located between said first and second mold halves and in combination with said tread ring defining a tire cavity, a drive sleeve rotatably secured to the inner end of said drive shaft and having drive members secured thereto, said drive sleeve connected to said inboard mold assembly for axial movement therewith between said inner and outer positions, a hub member secured to said core and having clutch means in rotatable driving engagement with said first and second mold halves, said hub member having a hub extension with recesses to receive said drive members on said drive sleeve in the inner position of said drive sleeve and inboard mold assembly, said hub member and said hub extension having an axial opening therethrough through which said idler shaft extends in its inward position to support said core, and drive means for rotatively driving said drive shaft.

2. A tire casting machine including in combination a housing, first bearing means mounted on said housing, a drive shaft rotatably mounted by said first bearing means, wall means defining a recess in the inward axial end of said drive shaft, a movable support member mounted by said housing, second bearing means carried by said support member, an idler shaft rotatably mounted by said second bearing means on said support member, wall means defining a guide end on the inward axial end of said idler shaft, means for moving said support member and idler shaft from an outer position inwardly to an inward position where said guide end of said idler shaft is received in said recess in said drive shaft, guide rods, an inboard mold assembly movable axially between inner and outer positions on said guide rods and relative to said drive shaft, said inboard mold assembly comprising a nonrotatable member connected to a rotatable first mold half through bearing means, means for moving said inboard mold assembly between said inner and outer positions, an outboard mold assembly movable axially between inner and outer positions on said guide rods and relative to said idler shaft, said outboard mold assembly comprising a nonrotatable member connected to a rotatable second mold half through bearing means, means for moving said outboard mold assembly between said inner and outer positions, a circumferentially extending tread ring connected to outer peripheral portions of said first and second mold halves, a core located between said first and second mold halves and in combination with said tread ring defining a tire cavity, a drive sleeve rotatably secured to the inner end of said drive shaft and having drive members secured thereto, said drive sleeve connected to said inboard mold assembly for axial movement therewith between said inner and outer positions, a hub member secured to said core and having clutch means in rotatable driving engagement with said first and second mold halves, said hub member having a hub extension with recesses to receive said drive members on said drive sleeve in the inner position of said drive sleeve and inboard mold assembly, said hub member and said hub extension having an axial opening therethrough through which said idler shaft extends in its inward position to support said core, and drive means for rotatively driving said drive shaft.

3. A tire casting machine including in combination a housing, first bearing means mounted on said housing, a drive shaft rotatably mounted by said first bearing means, a movable support member mounted by said housing, second bearing means carried by said support member, an idler shaft rotatably mounted by said second bearing means on said support member, wall means on the inner ends of said drive and idler shafts interfitting when the two shafts are brought axially into engagement with each other, means for moving said support member and idler shaft from an outer position inwardly to an inward position where said idler shaft engages said drive shaft, guide means, a first mold assembly movable axially between inner and outer positions on said guide means and relative to said drive shaft, said first mold assembly comprising a rotatable first mold half mounted on bearing means, means for moving said first mold assembly between said inner and outer positions, a second mold assembly movable axially between inner and outer positions on said guide means and relative to said idler shaft, said second mold assembly comprising a roatable second mold half mounted on bearing means, means for moving said second mold assembly between said inner and outer positions, a core located between said first and second mold halves and in combination therewith defining a tire cavity, a drive member rotatably secured to said drive shaft and movable axially with respect thereto to engage and rotatively drive said core, said core being in rotatable driving engagement with said first and second mold halves, said core having an axial opening therethrough through which said idler shaft extends in its inward position to support said core, and drive means for rotatively driving said drive shaft.

4. A centrifugal tire casting machine including in combination a rotatable drive shaft, a rotatable idler shaft in axial alignment with said drive shaft, a core member having an axial opening therethrough, means for axially moving at least one of said drive and idler shafts toward and away from the other so as to extend through the axial opening in said core member and into engagement with the other of said drive and idler shafts to rotatably support said core member, a first and a second mold half located on opposite sides of said core member and each adapted to move inwardly and outwardly between open and closed positions, said first and second mold halves in closed position being in rotative driving engagement with said core member and, also, defining a tire cavity in combination therewith, drive means extendable between said drive shaft and said core member for rotatively driving said core member, and means for moving said first and second mold halves between open and closed positions.

5. A centrifugal tire casting machine as claimed in claim 4, wherein said means for moving said first and second mold halves between open and closed positions comprises hydraulic cylinder and piston means and said hydraulic cylinder and piston means is essentially the only means holding said first and second mold halves closed during operation of the machine.

6. A centrifugal tire casting machine as claimed in claim 4, wherein said idler shaft is movable relative to said drive shaft and wall means are provided on the engaging ends of said shafts to interfit with each other.

7. A centrifugal tire casting machine as claimed in claim 6, wherein said rotative driving engagement between said first and second mold halves and said core member is effected by clutch discs between each of the first and second mold halves and said core member.

8. A centrifugal tire casting machine as claimed in claim 7, wherein said drive means comprises a sleeve member surrounding and rotatively connected to said drive shaft and movable axially with respect thereto to engage said core member to rotatively drive the same.

9. A centrifugal tire casting machine as claimed in claim 8, wherein safety latch means connect said first and second mold halves together in their closed positions to prevent accidental opening thereof.

10. A casting machine including in combination a first rotatable shaft, a second rotatable shaft, a core member having an opening, means for moving at least one of said first and second shafts toward and away from the other so as to extend in the opening in said core member and adjacent the other of said first and second shafts to rotatably support said core member, a first and a second mold half located on opposite sides of said core member and each adapted to move inwardly and outwardly between open and closed positions, said first and second mold halves in closed position being adopted to rotate with said core member and, also, defining a cavity in combination therewith, drive means for rotatively driving said core member and mold halves, and means for moving said first and second mold halves between open and closed positions.

11. A casting machine as claimed in claim 10, wherein the means for moving the mold halves to closed position is essentially the only means for holding the mold halves closed during a casting operation.

12. A casting machine as claimed in claim 10, wherein said second shaft is movable relative to said first shaft and wall means are provided on the engaging ends of the said shafts to interfit with each other.

13. A casting machine as claimed in claim 12, wherein said rotative driving engagement between said first and second mold halves and said core member is effected by clutch discs between each of the first and second mold halves and said core member.

14. A casting machine as claimed in claim 13, wherein said drive means comprises a sleeve member surrounding and rotatively connected to said first shaft and movable axially with respect thereto to engage said core member to rotatively drive the same.

15. A casting machine as claimed in claim 14, wherein safety latch means extend between said first and second mold halves in their closed positions to prevent accidental opening thereof.

* * * * *